US012267636B2

(12) United States Patent
Tan et al.

(10) Patent No.: US 12,267,636 B2
(45) Date of Patent: Apr. 1, 2025

(54) MEMS MICROPHONE

(71) Applicant: AAC ACOUSTIC TECHNOLOGIES (SHENZHEN) CO., LTD., Shenzhen (CN)

(72) Inventors: Siewseong Tan, Singapore (SG); Yangmeng Chang, Singapore (SG); Tiongkee Chua, Singapore (SG); Jingxin Pu, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 294 days.

(21) Appl. No.: 17/994,026

(22) Filed: Nov. 25, 2022

(65) Prior Publication Data

US 2023/0345157 A1 Oct. 26, 2023

Related U.S. Application Data

(63) Continuation of application No. PCT/CN2022/093437, filed on May 18, 2022.

(30) Foreign Application Priority Data

Apr. 21, 2022 (CN) ........................ 202220933196.X

(51) Int. Cl.
*H04R 1/04* (2006.01)
*H04R 19/04* (2006.01)

(52) U.S. Cl.
CPC ............... *H04R 1/04* (2013.01); *H04R 19/04* (2013.01); *H04R 2201/003* (2013.01)

(58) Field of Classification Search
CPC ........ H04R 3/00; H04R 19/04; H04R 19/005; H04R 1/04; H04R 2460/03; H04R 2201/003; H04R 3/005; H04R 1/406; H04R 1/2807; H04R 2410/05; G10L 21/0216; G10K 2210/129
USPC ............. 381/92, 23.1, 317, 91, 97, 355, 312
See application file for complete search history.

(56) References Cited

U.S. PATENT DOCUMENTS

2013/0208923 A1* 8/2013 Suvanto ................. H04R 3/005 381/122
2018/0288526 A1* 10/2018 Zou ...................... H04R 29/005
2018/0302727 A1* 10/2018 Deas ........................ H04R 1/04
2020/0374638 A1* 11/2020 Oplinger .............. H04R 25/606

* cited by examiner

*Primary Examiner* — Carolyn R Edwards
*Assistant Examiner* — Julie X Dang
(74) *Attorney, Agent, or Firm* — W&G Law Group

(57) ABSTRACT

The present invention provides a MEMS microphone, including a housing body with a containment space, a sound hole penetrating the housing body, a MEMS microphone chip, an ASIC chip and a subtractor accommodated in the containment space. The MEMS microphone chip includes at least a first MEMS microphone chip and a second MEMS microphone chip. the first MEMS microphone chip is different from the frequency response droop characteristic of the second MEMS microphone chip. the first MEMS microphone chip and the output signal of the second MEMS microphone chip are output to the subtractor, and are output to the ASIC chip after the subtractor performs subtraction processing. Compared with the related art, the MEMS microphone of the present invention has good anti-interference performance and good sensitivity.

7 Claims, 5 Drawing Sheets

(a)

(b)

(a)

(b)

(a)

(b)

MEMS MICROPHONE

FIELD OF THE PRESENT DISCLOSURE

The present invention relates to an acoustic-electrical conversion device, in particular to a MEMS microphone.

DESCRIPTION OF RELATED ART

Micro-electro-mechanical system (MEMS) microphone is an acoustic-electric transducer manufactured based on MEMS technology. Its characteristics are small size, good frequency response characteristics, low noise, etc., and it is one of the indispensable devices for mobile terminal.

The MEMS microphone in prior art includes a MEMS microphone chip based on capacity detection and a dedicated integrated circuit (Application Specific Integrated Circuit, ASIC) chip. The capacitor of the MEMS microphone chip will change correspondingly with the difference of the input sound signal, and then the ASIC chip is used to process and output the changed capacitor signal to realize the sound pickup.

However, with the wide application of high-power ultrasonic transceivers, the MEMS microphone is overloaded in this acoustic frequency band and causes noise. The level of the noise is related to the power of the ultrasonic transceiver itself, the distance from the MEMS microphone, and the sensitivity of the MEMS microphone in this frequency band. Although the 48 khz sampling of the audio hardware codec standard will filter sounds at frequencies of 24 khz and above, this distortion is already generated inside the MEMS microphone and extends to low frequencies. Noise with small amplitude but obvious sense of hearing is caused, that is, the anti-interference performance is poor and the sensitivity is poor.

Therefore, it is necessary to provide a new MEMS microphone to solve the above problems.

SUMMARY OF THE PRESENT INVENTION

The present invention is to provide a MEMS microphone with good anti-interference performance and good sensitivity.

Accordingly, the present invention provides a MEMS microphone including a housing body with a containment space, a sound hole penetrating the housing body, a MEMS microphone chip includes at least a first MEMS microphone chip and a second MEMS microphone chip accommodated in the containment space, an ASIC chip accommodated in the containment space, and a subtractor.

The first MEMS microphone chip has a frequency response droop characteristic different from that of the second MEMS microphone chip. An output signal of the first MEMS microphone chip and an output signal of the second MEMS microphone chip are both input to the subtractor for outputting an input signal to the ASIC chip.

Further, the frequency response droop characteristic of the first MEMS microphone chip is less than 1 khz; and the frequency response droop characteristic of the second MEMS microphone chip ranges from 1 khz to 30 khz.

Further, the first MEMS microphone chip and the second MEMS microphone chip are integrated into one body.

Further, the first MEMS microphone chip and the second MEMS microphone chip have a same frequency response resonance peak.

Further, the frequency response resonance peak of the first MEMS microphone chip is greater than the frequency response resonance peak of the second MEMS microphone chip.

Further, the frequency response resonance peak of the first MEMS microphone chip is smaller than the frequency response resonance peak of the second MEMS microphone chip.

Further, the frequency response resonance peak of the first MEMS microphone chip and the frequency response resonance peak of the second MEMS microphone chip are both greater than 20 khz.

Further, the subtractor is integrated in the ASIC chip.

Compared with the related art, the MEMS microphone of the present invention is provided with at least two MEMS microphone chips, and the frequency response droop characteristics of the two MEMS microphone chips are different, and the outputs of the two MEMS microphone chips are connected to the subtractor. Two-way signals output by the two MEMS microphone chips are subjected to Subtraction arithmetic by the subtractor, the signals in the ultrasonic frequency band eliminate each other out. The other frequency band signals are reserved, and then output to the ASIC chip for processing and then sent to the sounding device to achieve sound. mems microphone is effectively improved and the sensitivity is improved.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
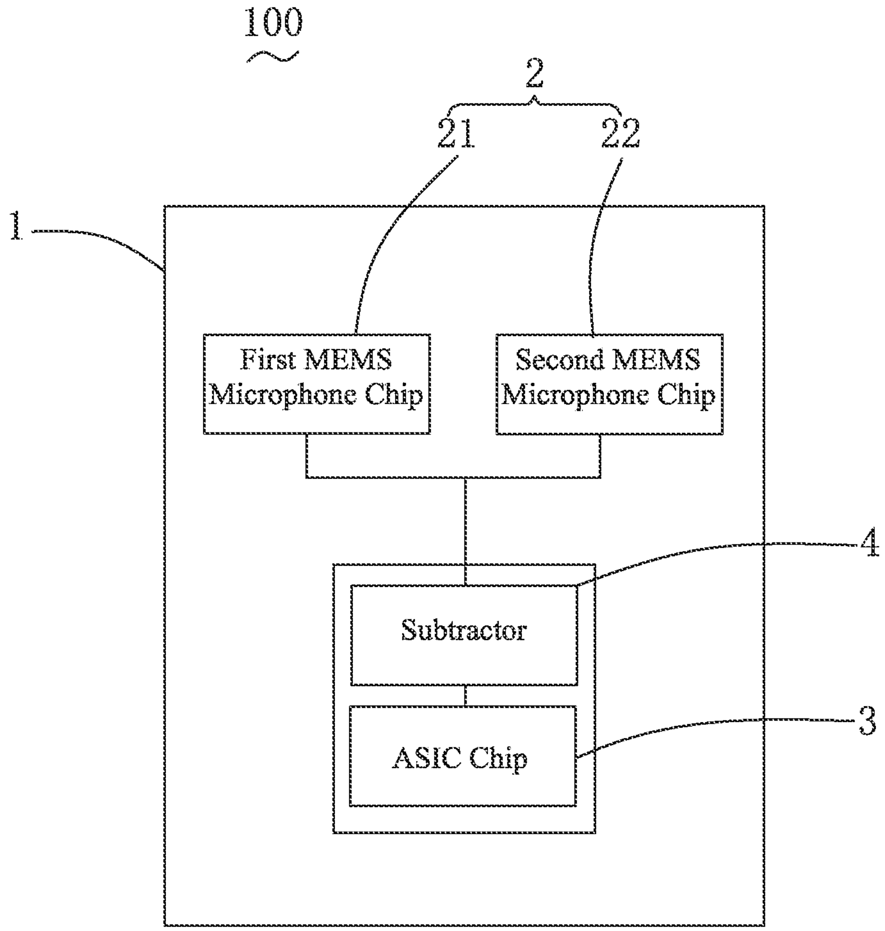
FIG. 1 is a structural diagram of a MEMS microphone in accordance with an embodiment of the present invention.

Please refer to FIG. 1, the present invention provides a MEMS microphone 100, including a housing body 1 with a containment space, a sound hole penetrating the housing body 1, an mems microphone chip 2, an ASIC chip 3, and a subtractor 4 contained in the containment space.

The mems microphone chip 3 includes at least two pieces, and in this embodiment, a first MEMS microphone chip 21 and a second MEMS microphone chip 22 are included.

Wherein, the frequency response droop characteristic of the first MEMS microphone chip 21 is different from the frequency response droop characteristic of the second MEMS microphone chip 22.

Wherein, the frequency response droop characteristic is defined as: The corresponding sensitivity of the frequency point is 3 db lower than the 1 khz sensitivity, that is, the frequency response curve attenuates the 3 db frequency point.

The output signal of the first MEMS microphone chip 21 and the output signal of the second MEMS microphone chip 22 are both input to the subtractor 4, and after the subtractor 4 performs subtraction processing, they are used as input signals of the ASIC chip 3. That is, the first MEMS microphone chip 21 and the second MEMS microphone chip 22 can be directly connected to the subtractor 4. It can also be connected to the subtractor 4 after other signal processing (such as signal amplification, filtering, etc.).

Specifically, in this embodiment, the output end of the first MEMS microphone chip 21 and the output end of the second MEMS microphone chip 22 are respectively connected to the first input end and the second input end of the subtractor 4. The output end of the subtractor 4 is connected to the input end of the ASIC chip 3. After the two-way signals generated by the first MEMS microphone chip 21 and the second MEMS microphone chip 22 are subjected to subtraction arithmetic through the subtractor 4, ultrasonic band signals eliminate each other, while other band signals remain.

More preferably, the subtractor 4 is integrated in the ASIC chip 3, which can effectively reduce the volume occupation of the MEMS microphone, which is beneficial to miniaturization.

In this embodiment, specifically, the frequency response droop characteristic of the first MEMS microphone chip 21 is less than 1 khz, and the frequency response droop characteristic of the second MEMS microphone chip 22 ranges from 1 khz to 30 khz. After two-way signals is proceed the subtraction arithmetic, the ultrasonic frequency band signals eliminate each other, while the other frequency band signals remain. The frequency response resonance peak of the first MEMS microphone chip 21 and the frequency response resonance peak of the second MEMS microphone chip 22 are both greater than 20 khz.

Figure 2:
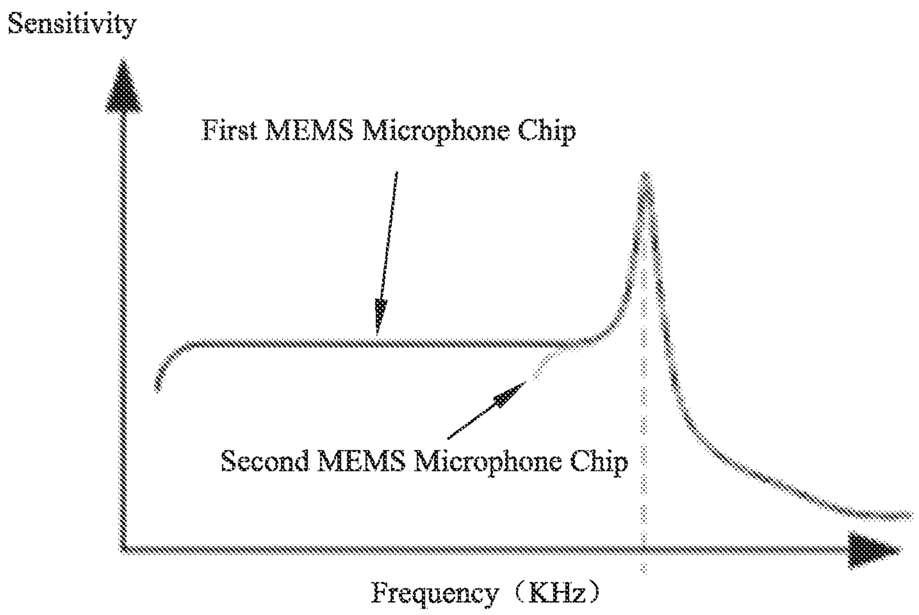
FIG. 2 is a performance curve when a first MEMS microphone chip of a MEMS microphone of the present invention has a same frequency response resonance peak to a second MEMS microphone chip, wherein, FIG. 2(*a*) is a performance curve before signal processing, and FIG. 2(*b*) is a performance curve after signal processing.
Figure 2:
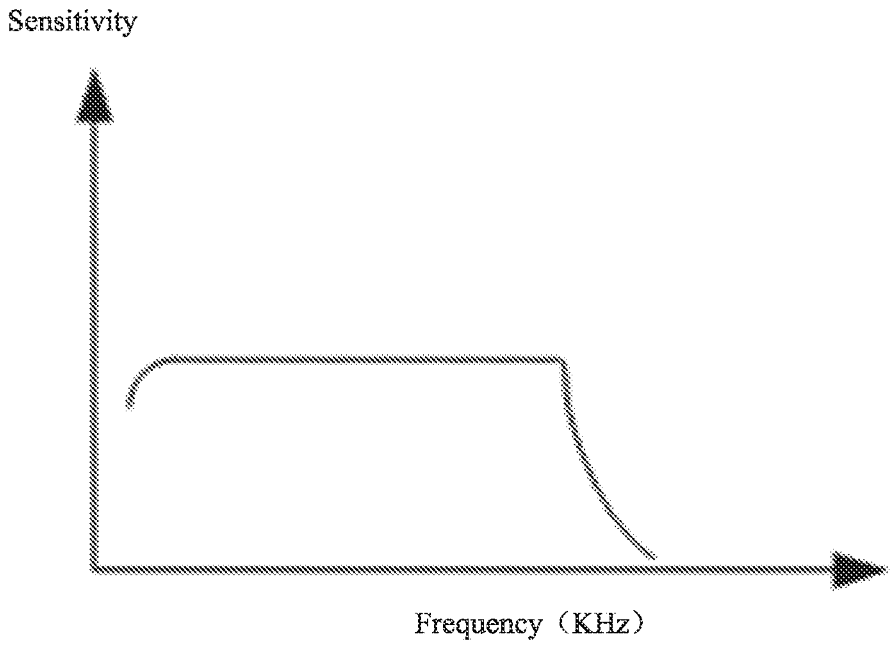

The frequency response resonance peak of the first MEMS microphone chip 21 and the second MEMS microphone chip 22 is the same. As shown in FIG. 2, FIG. 2(*a*) is the performance curve before signal processing, and FIG. 2(*b*) is the performance curve after signal processing. It can be seen that after the two-way signals is being proceed the subtraction arithmetic, the ultrasonic frequency band signals eliminate each other, while the other frequency band signals remain.

Figure 3:
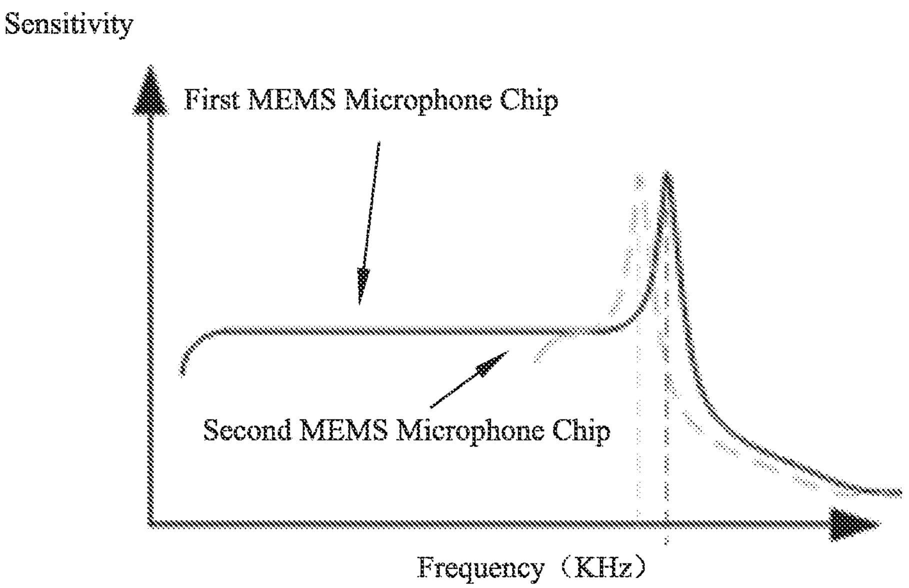
FIG. 3 is a performance curve when the frequency response resonance peak of the first MEMS microphone chip of the MEMS microphone of the present invention is greater than the frequency response resonance peak of the second MEMS microphone chip, wherein, FIG. 3(*a*) is the performance curve before signal processing, and FIG. 3(*b*) is the performance curve after signal processing.
Figure 3:
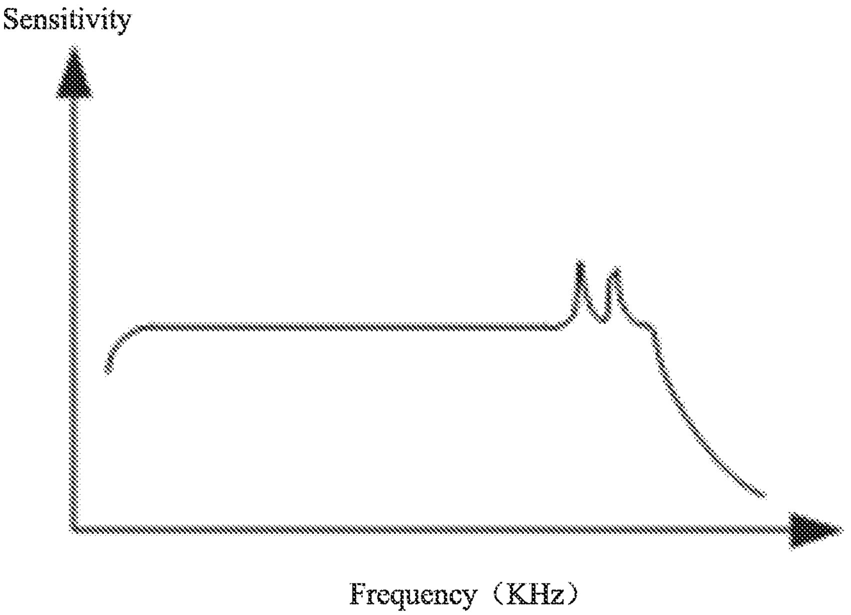

The frequency response resonance peak of the first MEMS microphone chip 21 is greater than the frequency response resonance peak of the second MEMS microphone chip 22. As shown in FIG. 3, where FIG. 3(*a*) is the performance curve before signal processing, and FIG. 3(*b*) is the performance curve after signal processing. It can be seen that after the two-way signals is being proceed the subtraction arithmetic, the ultrasonic frequency band signals eliminate each other, while the other frequency band signals remain.

Figure 4:
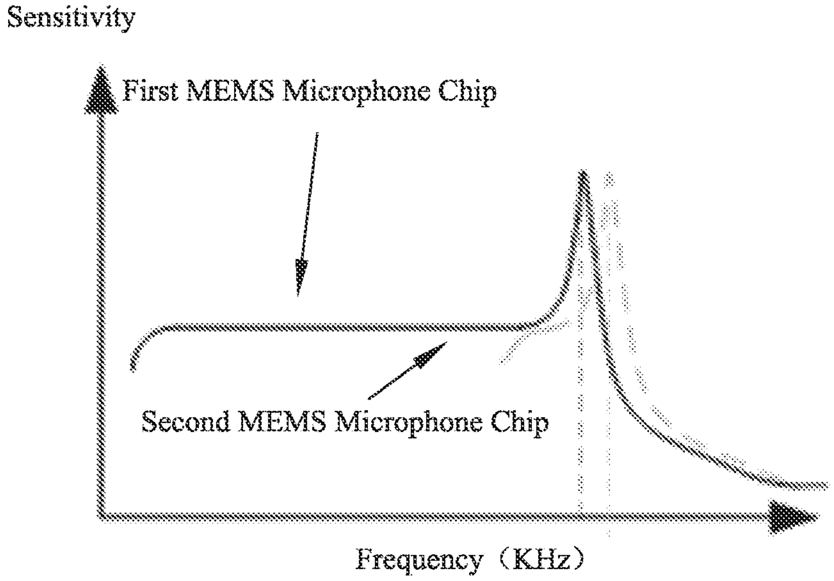
FIG. 4 is a performance curve when the frequency response resonance peak of the first MEMS microphone chip of the MEMS microphone of the present invention is smaller than the frequency response resonance peak of the second MEMS microphone chip, wherein, FIG. 4(*a*) is the performance curve before signal processing, and FIG. 4(*b*) is the performance curve after signal processing.
Figure 4:
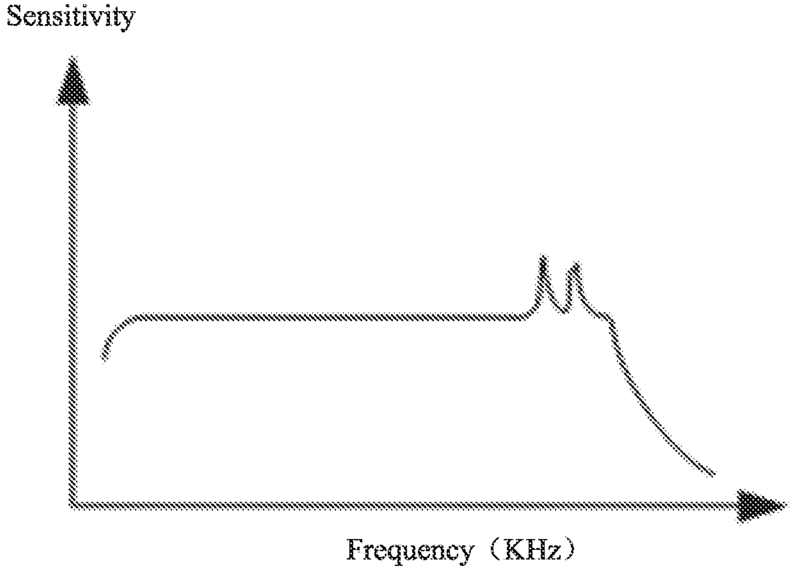

The frequency response resonance peak of the first MEMS microphone chip 21 is smaller than the frequency response resonance peak of the second MEMS microphone chip 22. As shown in FIG. 4, FIG. 4(*a*) is the performance curve before signal processing, and FIG. 4(*b*) is the performance curve after signal processing. It can be seen that after the two-way signals is being proceed the subtraction arithmetic, the ultrasonic frequency band signals eliminate each other, while the other frequency band signals remain.

Figure 5:
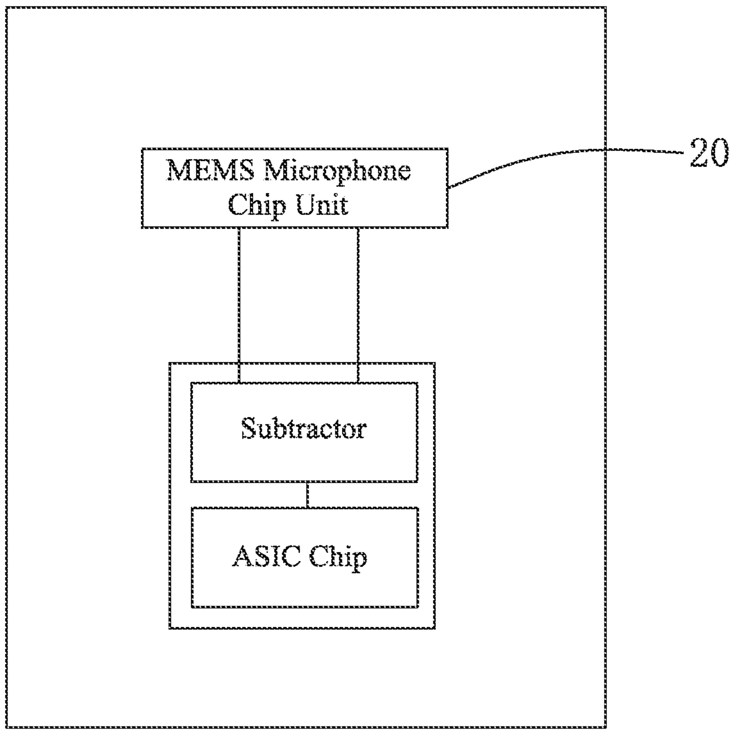
FIG. 5 is a structural diagram of a MEMS microphone in accordance with another embodiment of the present invention.

The present invention also provides another embodiment, which is basically the same as the above embodiment, and the same parts will not be repeated. The difference is: as shown in FIG. 5, the first MEMS microphone chip and the second MEMS microphone chip are integrated into a MEMS microphone chip unit 20. Therefore, the volume occupation of the MEMS microphone can be effectively reduced, which is beneficial to miniaturization.

Compared with the related art, in the MEMS microphone of the present invention, at least two MEMS microphone chips are provided. In addition, the frequency response droop characteristics of the two MEMS microphone chips are different, and the outputs of the two MEMS microphone chips are connected to the subtractor. Two-way signals output by the two MEMS microphone chips are subjected to Subtraction arithmetic by the subtractor, the signals in the ultrasonic frequency band eliminate each other out. The signals of other frequency bands are reserved, and then output to the ASIC chip for processing and then transmitted to the sounding device to achieve sound generation, thereby effectively improving the anti-interference performance of the MEMS microphone and improving the sensitivity.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A MEMS microphone, including:

a housing body with a containment space;

a sound hole penetrating the housing body;

a MEMS microphone chip includes at least a first MEMS microphone chip and a second MEMS microphone chip accommodated in the containment space;

an ASIC chip accommodated in the containment space; and a subtractor;

wherein the first MEMS microphone chip has a frequency response droop characteristic less than 1 khz;

the second MEMS microphone chip has a frequency response droop characteristic ranging from 1 khz to 30 khz;

an output signal of the first MEMS microphone chip and an output signal of the second MEMS microphone chip are both input to the subtractor for outputting an input signal to the ASIC chip; the subtractor is configured to eliminate ultrasonic frequency band signals of the output signals of the first MEMS microphone chip and the second MEMS microphone chip.

2. The MEMS microphone as described in claim 1, wherein the first MEMS microphone chip and the second MEMS microphone chip are integrated into one body.

3. The MEMS microphone as described in claim 1, wherein, the first MEMS microphone chip and the second MEMS microphone chip have a same frequency response resonance peak.

4. The MEMS microphone as described in claim 1, wherein the frequency response resonance peak of the first MEMS microphone chip is greater than the frequency response resonance peak of the second MEMS microphone chip.

5. The MEMS microphone as described in claim 1, wherein the frequency response resonance peak of the first MEMS microphone chip is smaller than the frequency response resonance peak of the second MEMS microphone chip.

6. The MEMS microphone as described in claim 3, wherein the frequency response resonance peak of the first MEMS microphone chip and the frequency response resonance peak of the second MEMS microphone chip are both greater than 20 khz.

7. The MEMS microphone as described in claim 1, wherein the subtractor is integrated in the ASIC chip.

* * * * *